No. 697,633. Patented Apr. 15, 1902.
O. C. KNIPE.
AXLE BEARING.
(Application filed May 4, 1901.)
(No Model.)

Witnesses
Robt E. Chapman
Marcus L. Byng.

Inventor.
Oliver C Knipe
by Robt H Read
his atty.

UNITED STATES PATENT OFFICE.

OLIVER C. KNIPE, OF NORRISTOWN, PENNSYLVANIA.

AXLE-BEARING.

SPECIFICATION forming part of Letters Patent No. 697,633, dated April 15, 1902.

Application filed May 4, 1901. Serial No. 58,713. (No model.)

*To all whom it may concern:*

Be it known that I, OLIVER C. KNIPE, a citizen of the United States, residing at Norristown, county of Montgomery, State of Pennsylvania, have invented certain new and useful Improvements in Axle-Bearings, of which the following is a specification.

The object of this invention is to provide a low-priced, effective, and durable axle or spindle which will admit of endwise adjustment and maintain a wheel in the best operating relation and permit it to be readily mounted on and detached from the spindle.

The invention is of particular advantage in connection with wheel-axles, the end being to dispense with the cutting of right and left hand threads, as is commonly practiced, to keep the adjusting-nuts from working loose. It is, however, of broader applicability and may be employed in all classes of machinery with advantage by reason of its low cost and effective adjustment.

I carry out the invention by mounting on the spindle an adjusting device entering a cavity, through which it may be moved to shift a collar or washer along the axis of the spindle. The preferred form of construction embodies an adjusting screw or bolt set in a threaded hole bored through the spindle at an acute angle to its axis, the end of the screw engaging a washer bearing against the wheel or other rotary part. This, however, is not in all cases essential, as the screw may be set axially and by its adjustment shift a second movable part which coöperates with the rotary part, as will be hereinafter more fully set forth.

The invention comprises in its essential features an adjusting device for limiting end play of a rotary part on the spindle or shaft movable through the shaft at an angle to its axis.

The several features of novelty will be hereinafter more fully described, and will be definitely indicated in the claims appended to the specification.

Figure 1:
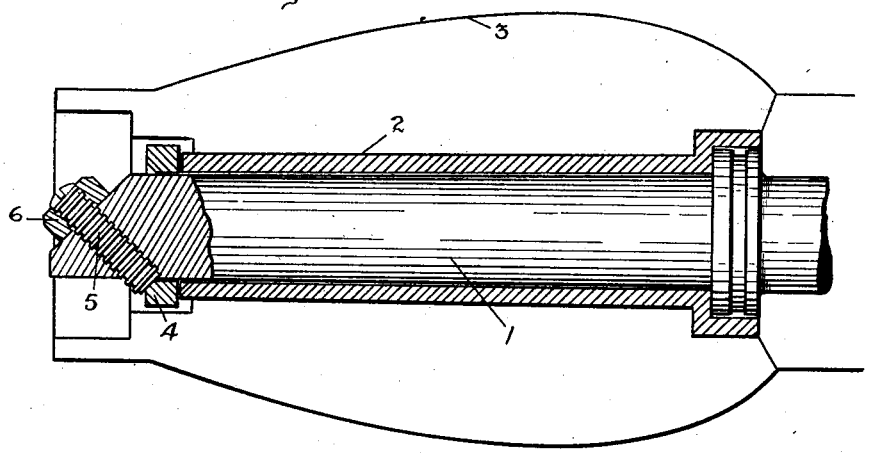
Figure 2:
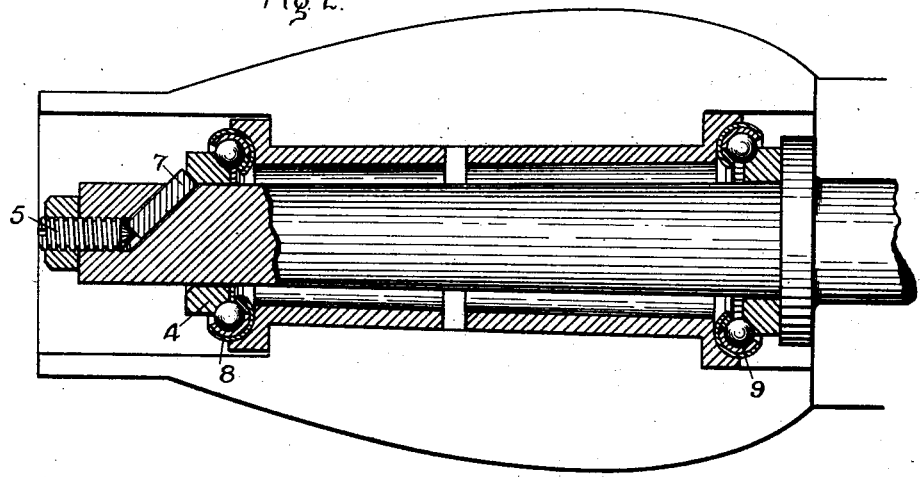

In the accompanying drawings, which illustrate two forms of the invention, Figure 1 is a sectional view of a wheel-axle embodying my improvements. Fig. 2 is a similar view of a modification.

1 represents the wheel-spindle, and 2 a steel lining for the wheel-hub 3.

I provide a movable collar 4 and an adjusting-screw 5, coöperating with the collar, so as to shift the latter lengthwise of the spindle. In the type shown in Fig. 1 this screw extends through the spindle at an acute angle to its axis, engaging the sleeve 4. One end of the spindle is cut off on a bevel and a screw-hole tapped in to accommodate the screw 5. By turning the screw the collar 4 may be adjusted to take up for wear or to adjust the amount of end play in the wheel. The screw may be clamped when set by a jam-nut 6. The screw being at an angle to the axis of the wheel has no tendency to work loose by forward or backward running of the wheel, and both ends of the axle may be provided with adjusting-screws with right-hand threads.

In the type shown in Fig. 2 the adjusting-screw 5 may be let in from the end of the spindle, a counterbore at an acute angle to the shaft being made to communicate with the screw-hole. In this counterbore may be placed a pin 7, the lower end of which engages a tapering tip on the screw. Obviously in this case a longitudinal movement of the screw will shift the piece 7 and adjust the collar 4. In the form shown in Fig. 2 the hub is provided with a lining in which is mounted a ball-bearing, as indicated at 8 9, and the adjusting device permits a cone-face on the sleeve 4 to be nicely adjusted with relation to the ball-race 8, so as to produce the best running adjustment for the wheel.

While the invention has been shown and described as of particular advantage in connection with vehicle-axles, it may be employed in all classes of machinery.

Having thus described my invention, what I claim as new, and desire to secure by Letters Patent, is—

1. A shaft or axle having an adjusting device engaging a sleeve on the shaft and adjustable in a line oblique to the axis.

2. A shaft or axle having a sleeve adjustable along the bearing-surface, and an adjusting device carried by the shaft engaging the sleeve and adjustable across the plane of the axis of the shaft.

3. A shaft or axle having a bore inclined to its axis, adjusting device in the bore, and a movable sleeve on the shaft engaged by said device.

4. A shaft or axle perforated at an oblique angle to its axis and provided with an adjusting-screw in the perforation adapted to shift the bearing-surface of the wheel.

5. A shaft or axle perforated at an acute angle to its axis and provided with an adjusting-screw in the perforation adapted to shift the bearing-surface of the wheel.

6. A shaft or axle perforated at an acute angle to its axis and provided with an adjusting-screw in the perforation, a sliding collar on the shaft and a jam-nut for the screw.

7. A shaft or axle having a beveled end perforated on the beveled piece at an acute angle to its axis, an adjusting-screw in the perforation, and a sliding collar on the shaft engaged by the screw.

In witness whereof I have hereunto set my hand this 1st day of May, 1901.

OLIVER C. KNIPE.

Witnesses:
WM. H. RITTENHOUSE,
CHARLES BAUER.